United States Patent [19]
Holemans et al.

[11] Patent Number: 4,791,000
[45] Date of Patent: * Dec. 13, 1988

[54] FAT AND EDIBLE EMULSIONS WITH A HIGH CONTENT OF CIS-POLYUNSATURATED FATTY ACIDS

[75] Inventors: Pieter M. J. Holemans, Ekeren, Belgium; Robert Schijf, Vlaardingen, Netherlands; Karel P. A. M. Van Putte, Maasland, Netherlands; Teunis De Man, Maassluis, Netherlands

[73] Assignee: Internationale Octrooi Maatschappij "Octropa" B.V., Rotterdam, Netherlands

[*] Notice: The portion of the term of this patent subsequent to Oct. 27, 2004 has been disclaimed.

[21] Appl. No.: 883,726

[22] Filed: Jul. 9, 1986

[30] Foreign Application Priority Data

Jul. 9, 1985 [NL] Netherlands .......................... 8501957

[51] Int. Cl.$^4$ ............................................. A23D 5/02
[52] U.S. Cl. ...................................... 426/606; 426/607
[58] Field of Search ................................ 426/606, 607

[56] References Cited

U.S. PATENT DOCUMENTS

| | | | |
|---|---|---|---|
| 3,949,105 | 4/1976 | Wieske et al. | 426/607 |
| 4,016,302 | 4/1977 | Kattenberg et al. | 426/607 |
| 4,055,679 | 10/1977 | Kattenberg et al. | 426/607 |
| 4,567,056 | 1/1986 | Schmidt | 426/603 |
| 4,590,087 | 5/1986 | Pronk et al. | 426/607 |
| 4,702,928 | 10/1987 | Wieske et al. | 426/607 |

FOREIGN PATENT DOCUMENTS

| | | | |
|---|---|---|---|
| 0009207 | 7/1982 | European Pat. Off. | |
| 0186244 | 7/1986 | European Pat. Off. | 426/607 |
| 0145279 | 1/1975 | Netherlands . | |
| 8300161 | 1/1983 | PCT Int'l Appl. | 426/607 |

*Primary Examiner*—Donald E. Czaja
*Assistant Examiner*—Carolyn Paden
*Attorney, Agent, or Firm*—Cushman, Darby & Cushman

[57] ABSTRACT

A hardstock suitable for producing margarines and reduced fat spreads rich in polyunsaturated fatty acids and a process for producing such hardstock, which involves directed interesterification of liquid oils and random interesterification of lauric fats and long chain fatty acids, using a chemical or an enzymic catalyst.

5 Claims, No Drawings

FAT AND EDIBLE EMULSIONS WITH A HIGH CONTENT OF CIS-POLYUNSATURATED FATTY ACIDS

The present invention relates to hardstocks and fat blends which are suitable for the preparation of diet margarines and spreads with a reduced fat content and to a process for preparing these hardstocks and fat blends.

Diet margarines and spreads are emulsions of water and oil, preferably emulsions in which the oil phase forms the continuous phase (since such emulsions are bacteriologically more stable) and mainly consists of triglycerides, which are rich in cis-polyunsaturated fatty acids. Triglycerides of cis-polyunsaturated fatty acids are known for their cholesterol-reducing action and consequently are highly valued by more and more consumers. Margarines generally contain about 80% fat, while low-calorie spreads generally contain 20–60% fat.

The fat blends which are suitable for margarines consist of a matrix of hardstock crystallized at room temperature in which an oil is occluded which is liquid at room temperature (20° C.). The liquid oil is preferably an oil rich in triglycerides derived from cis-polyunsaturated fatty acids, i.e. an oil containing 40 to 70% or more cis-polyunsaturated fatty acids.

In recent years attempts have been made to increase the proportion of these triglycerides at the expense of the solid fat, while retaining the physical stability of the product, that is to say while retaining the resistance to oil exudation during storage and spreading of the emulsions which are prepared using these fat blends. With success, fat blends have been prepared which contain about 15% of a hardstock which is solid at room temperature, the remainder of the fat mainly consisting of triglycerides derived from polyunsaturated fatty acids. Very recently, investigation has been carried out by Applicants with the aim of preparing fat blends which have an extremely low content of triglycerides from saturated fatty acids. This investigation has led to a hardstock and to fat blends, which form the subject of the present invention, and to a process of preparing such. The hardstock, or the structural fat according to the invention, comprises $H_3$, HHU, HUH and $H_2M$ triglycerides in which the ratio HHU:HUH ranges from 1:4 to 6:1, and preferably ranges from 1:2 to 5:1, in which H represents saturated fatty acids having 16–24 C atoms, U represents monounsaturated or cis-polyunsaturated fatty acids having 16–24 C atoms and M represents fatty acids of which the chain length is 2–10 C atoms shorter than the chain length of fatty acids H, and preferably the chain length of the fatty acids M is 12 or 14 C atoms.

For good physical stability at 20° C. and so-called "body", the ratio $H_2M:H_3$ is of some importance, this generally varying from 1:2 to 4:1, and preferably from 1:1 to 3:1. The content of $H_2M$ triglycerides will generally not exceed 90%, preferably it will be less than 65 wt.% and ideally range from 15–60 wt.% (these percentages are based on the total weight of the hardstock).

$H_2M$ triglycerides are very effective as matrix (structural fat) for the emulsion without exhibiting the detrimental effects, with respect to the melting behaviour, of the $H_3$ triglycerides.

$H_2U$ triglycerides also contribute to the structure of emulsions. The content of these triglycerides in the hardstock will generally range from 10–70 wt.%, and preferably range from 30 to 65 wt.%. $H_3$ triglycerides can be present in the hardstock generally in an amount of at most 60% and preferably of 10–55 wt.%. As already reported, these triglycerides leave behind a waxy impression in the mouth when present in a large amount in edible emulsions.

The hardstock according to the invention can be prepared by a process which comprises the following steps:
  (i) directed interesterification of a mixture of triglycerides mainly originating from an oil which is liquid at room temperature (20° C.), whereby an amount of fat is formed which is solid at the interesterification temperature and remains solid at 20° C.,
  (ii) the preparation of $H_2M$ triglycerides or of a mixture rich in $H_2M$ triglycerides; and
  (iii) combining the amount of solid fat formed in step (i) and the $H_2M$ triglycerides obtained in step (ii).

The mixture of triglycerides to be submitted to directed interesterification preferably has a content of cis-polyunsaturated fatty acids of at least 40% and ideally of 60–75% (calculated on the weight of fatty acids). This mixture can consist of oils or oleins which contain no solid fat at room temperature (20° C.), such as for example safflower oil, sunflower oil, grapeseed oil, maize oil or mixtures thereof.

Directed interesterification of oils is a technique known per se, which has been described, inter alia, in U.S. Pat. No. 2,442,532. In essence, the gist of the method is that interesterification takes place in the presence of a catalyst at a temperature below that at which the liquid oil phase is saturated with relatively high-melting triglycerides (which are mainly derived from 3 saturated fatty acids or 2 saturated H fatty acids and 1 unsaturated fatty acid), which are formed during the interesterification, crystallize and take no further part in the interesterification process. In consequence, the percentage of higher-melting triglycerides rises as long as the crystallization progresses. Crystallization of such relatively insoluble, solid triglycerides can keep going as long as their solubility in the liquid phase at the reaction temperature is lower than that of the amount freshly formed during the reaction. Completely saturated triglycerides such as tristearin and tripalmitin are practically insoluble in the liquid oil, so that the effect of the process will be that saturated fatty acids originating from triglycerides of the mixed type, i.e. triglycerides containing both saturated and unsaturated fatty acid chains, are converted into $H_2U$ triglycerides (mainly asymmetric HHU triglycerides), $H_3$ triglycerides (completely saturated) and for an important part triglycerides from 3 unsaturated or from 2 unsaturated fatty acids and 1 saturated fatty acid. The advantage of this method is that saturated fatty acids which were present in triglycerides of the liquid oil phase and made no contribution to the structure, are converted after the directed interesterification into triglycerides which do make a contribution to the structure (matrix in which oil can be occluded), as a result of which less hardstock, for example fat components consisting of $H_2M$ triglycerides, needs to be added to oil, with the final result that a margarine fat blend can be prepared having a relatively low content of saturated fatty acids, or a high ratio of polyunsaturated fatty acids to saturated fatty acids. The above-mentioned U.S. Pat. No. 2,442,532, reports in detail how the directed interesterification can be carried out. Several variations can be made in the process, such as, for example, cooling the liquid oil before the directed interesterification in order to form seed crystals of high-melting triglycerides. Most of the variations of the basic process have as aim the acceleration of the conversion, which under normal conditions can last for days. Thus, in NL 145 279 a process for the directed interesterification of a mixture of triglycerides is described in which the mixture is alternately subjected at least three times to a temperature which is below the cloud point of the interesterified mixture and subsequently to a temperature above the cloud point of the mixture. Subjecting oil to a number of temperature cycles is also described in European application 79103419 (publication number 0009207).

Processes in which temperature cycles are used require an accurate control of the temperature. According to the aforementioned NL 142 279, the mixture to be interesterified is alternately kept at a temperature 1°-15° below the cloud point that a randomly interesterified mixture of the same triglycerides would have and thereafter at a temperature which is at least just as high as and preferably not more than 15° C. above the cloud point of said randomly interesterified mixture. This treatment is continued until the cloud point of the reaction mixture is at least 5° C., preferably at least 10° C. above the cloud point of the aforesaid randomly interesterified mixture. According to the present invention a process as described above can be applied. However, a method is preferred in which the directed interesterification is carried out substantially isothermally, i.e. without use of temperature changes, at a temperature remaining practically constant. The most suitable temperature will obviously depend on the mixture used of the triglycerides to be interesterified. The most suitable mixtures to be used for the purpose of the present invention comprise oils which contain at least 40% and preferably 60–75% of cis-polyunsaturated fatty acids, such as sunflower oil, safflower oil, grapeseed oil, maize oil and the like. Preferably, safflower oil, sunflower oil or mixtures thereof are submitted to isothermal directed interesterification.

The interesterification temperature may vary from −5° C. to +10° C. Preferably, a reaction temperature of 0°-8° C. is applied.

The reaction time can vary from 20 to 72 hours. These long reaction times are the result of
(i) the applied low temperatures which are necessary for the crystallization of mainly trisaturated triglycerides ($H_3$) and disaturated and mono-unsaturated triglycerides ($H_2U$), which low temperatures cause a low speed of interesterification in the liquid and
(ii) the low supersaturation ratios for $H_3$ and $H_2U$ triglycerides.

In order to shorten the reaction time, for example to 20 hours and less, and to effect an easier separation of liquid oil and relatively large crystals after interesterification, it is advantageous to add to the liquid oil that is to be interesterified a small amount of saturated fat, such that the total level of saturated fatty acids ranges from 12–17% (calculated on the weight of fatty acids). Preferably 1–6% (calculated on fat) of a completely saturated fat is added, preferably completely saturated sunflower oil having a melting point of 69° C. or completely saturated rapeseed oil having a melting point of 70° C. Also advantageous is the addition of a partially hydrogenated fat to the oil to be interesterified, in an amount such that between 0 and 10% of elaidic acid is present in the total mixture. The interesterification reaction is carried out until the desired amount of solid phase is obtained. This can for example be determined by nuclear magnetic resonance measurements, e.g. at 20° C. If it is desired not to apply too long a reaction time, the reaction can be carried out until less than the maximum amount of solid phase to be formed has been formed. In the sunflower oil/hydrogenated sunflower oil system in the ratio 95.5:4.5, an amount of solid phase of 5–10% at 20° C. (calculated on fat) is sufficient indication to stop the directed interesterification process. Generally the reaction is carried out until the content of saturated fatty acids in the olein obtained, after removal of the saturated triglycerides formed, which are insoluble at the reaction temperature, is below 9% and preferably between 4 and 8% (calculated on fatty acids).

Suitable interesterification catalysts are, for example, sodium ethoxide, potassium ethoxide, sodium methoxide, potassium methoxide, sodium or potassium metal and/or alloys thereof, which are used in amounts varying from 0.1 to 1%, preferably from 0.2 to 0.8%, on the basis of the weight of the mixture to be interesterified.

The liquid oil to be interesterified is, as usual, dried to a moisture content of preferably less than 0.1 wt.% and is subsequently mixed with the catalyst, which is activated at a temperature lying between 40° and 70° C. Hereafter the reaction mixture is cooled comparatively quickly, preferably quicker that 10° C. per minute, to the selected temperature.

After completion of the interesterification reaction it is possible to remove the formed solid phase by fractionation. This can for example be done by applying the so-called Lanza fractionation with the aid of an aqueous solution of a surface-active material such as sodium dodecylsulphate.

The preferred triglyceride composition of the liquid oil resulting from controlled interesterification, to which optionally a small amount of a completely saturated, high-melting fat has been added in order to speed up the reaction, if need be after removal of the insoluble stearin, can be given as follows:

| $H_3$ triglycerides | 1 to 6% |
|---|---|
| HUH | 0.5 to 3% |
| HHU | 0.5 to 6% |
| $HU_2 + U_3$ | 85 to 98% |

As already stated, the $H_3$ and, if need be, the $H_2U$ triglycerides can be removed by fractionation and, during the preparation of the final fat mixture, be replaced by another hardstock consisting mainly of $H_2M$, or remain in the interesterified mixture and form part of the total hardstock component of the fat mixture. The above-mentioned, essential $H_2M$ triglycerides can be obtained by interesterification, for example random interesterification, of a mixture of triglycerides in which the ratio of H to M fatty acids lies in the range 0.4 to 8.5, preferably 1.0 to 3.0.

Random interesterification is carried out under moisture-free conditions, preferably at a temperature of 100°–140° C., under reduced pressure, in the presence of a catalyst, such as an alkali metal alkoxide, an alkali metal or an alkali metal hydroxide.

It is also possible to produce $H_2M$ triglycerides by interesterification of a suitable mixture of fatty acids with glycerol, for example according to the following method:

One part glycerol is mixed with about 3.5 to 3.8 parts of the mixture of fatty acids. The mixture of fatty acids and glycerol is quickly heated, in a vessel provided with a jacket, to a temperature of about 190° C. and is subsequently kept for at least 3 hours at a temperature of 220° C. to 225° C. The reaction is carried out with stirring, under atmospheric pressure, in a vessel standing under nitrogen. During the reaction, water is removed by distillation. After a reaction time of 3–4 hours, the free fatty acid content of the mixture is determined. When the content of free fatty acids remains unchanged, the reaction is complete and the excess fatty acids are removed by distillation at a temperature of 240° C. at a pressure of 5 mm mercury. During the distillation the content of free fatty acid is determined and as soon as an acid value of 4 is obtained, the reaction is stopped and the product is cooled to a temperature of 90° C. The mixture of hard fats is subsequently refined and bleached with alkali. $H_2M$ triglycerides are preferably produced by random interesterification of a partly or completely hydrogenated fat (a) which is selected from coconut, babassu, palmkernel, tucum, murmuru or ouricurum fat, mixtures of these fats or fractions thereof, having a melting point between 30° and 41° C., with a fat (b), which is completely or partly hydrogenated and is optionally fractionated, in which at least 60% of the fatty acid radicals are $C_{16-24}$ saturated fatty acid radicals. Fat (b) is preferably selected from hydrogenated palm oil or hydrogenated fractions of palm oil, soyabean oil, groundnut oil, sunflower oil, maize oil or rapeseed oil (possibly with a high content of erucic acid), having a melting point varying from 50° to 71° C.; and fractionation of the interesterified mixture.

Fractionation can be carried out in the absence of a solvent (dry fractionation), in the presence of an organic solvent (wet fractionation) such as acetone or hexane, or by using an aqueous solution of a surface-active material (the so-called Lanza fractionation), under conditions such that part—and preferably the major part—of the triglycerides (a) and (c), defined hereafter, are removed, so that a fat is obtained having the following triglyceride composition:

Triglycerides (a) consisting of a mixture of HML, $M_3$, $M_2H$, $M_2L$, $HL_2$, $ML_2$ and $L_3$, wherein H and M have the same meanings as above and L is a saturated fatty acid radical with less than 12 C atoms: 0–20 wt.%;

Triglycerides (b), so-called $H_2M$ triglycerides: 55–100 wt.%, preferably 65–100 wt.%;

Triglycerides (c) (so-called $H_3$ triglycerides): 0–20 wt.%.

Fractionation is preferably carried out in an organic solvent, especially acetone, and preferably in 1 step or in 2 steps, the first step being carried out at 22°–35° C., preferably 24°–29° C., whereby a high-melting stearin fraction is obtained containing mainly triglycerides of three saturated fatty acids of the H type, and a lower-melting olein fraction is obtained which is fractionated further at 8°–24° C., preferably 15°–22° C., whereby a second stearin fraction is obtained containing 55–100 wt.%, preferably 65–100 wt.% of triglycerides (b) and 0–25 wt.%, preferably 0–10 wt.% triglyceride (c).

It is also possible to carry out a first fractionation at 8°–24° C., with a stearin fraction and an olein fraction being obtained, and subsequently to fractionate the stearin at 22°–35° C., whereby a second stearin and a second olein (mid-fraction) enriched in triglycerides (b) are obtained.

Another suitable fractionation method consists in mixing the mixture to be fractionated with a diluting liquid oil such as soyabean oil or sunflower oil and carrying out the fractionation, preferably in two steps, the first step at 15°–35° C., preferably at 20°–29° C., and the second step at 8°–24° C., preferably at 15°–22° C., whereby a mid-fraction enriched in triglycerides (b) is obtained.

It is also possible to carry out a one-step fractionation, either in the presence of an organic solvent, such as e.g. hexane or acetone, at a temperature lying between 8° and 20° C., by which a stearin which is rich in $H_2M$ triglycerides and an olein which is relatively poor in $H_2M$ triglycerides are obtained, or in the absence of a solvent (dry fractionation) between 15° and 25° C.

Preferably a fat rich in lauric acid, obtained by dry fractionation at a temperature lying between 20° and 26° C., e.g. palmkernel olein, which has optionally been hydrogenated to a melting point of 39°–41° C., is mixed with palm oil having a melting point of 55°–58° C. in a ratio of 70–80:30–20 and randomly interesterified, whereafter the mixture is fractionated in the presence of acetone at a temperature lying between 8° and 20° C., preferably between 9° and 15° C., by which the stearin fraction rich in $H_2M$ triglycerides is isolated.

Another suitable manner of preparing $H_2M$ triglycerides comprises the interesterification of a mixture of hydrogenated fat rich in lauric acid, e.g. palm-kernel olein, with a rapeseed oil hydrogenated to a melting point of 70° C. preferably having a high content of erucic acid, in a ratio of 70–80:30–20, whereafter fractionation as described above is carried out in one step.

Very suitable triglyceride mixtures which are rich in $H_2M$ triglycerides can be obtained by isolating a mid-fraction which is obtained by the double wet fractionation described above. The double fractionation can be carried out on a randomly interesterified mixture that has been obtained starting from hydrogenated palmkernel olein (melting point 41° C.) and hydrogenated palm oil (melting point 58° C.) in a ratio of 40–60:60–40, or starting from the same hydrogenated palmkernel olein and rapeseed oil (melting point 70° C.), which is preferably rich in erucic acid, in a ratio of 30–40:70–60. It is obviously also possible to use the starting materials of the mixture to be randomly interesterified in non-hydrogenated form and to perform hydrogenation after interesterification.

$H_2M$ triglycerides can also be prepared by an enzymatic process by subjecting a mixture of triglycerides which form a source of H and M fatty acids, or a mixture of triglycerides and fatty acids as source of H and M fatty acids, to enzymatic interesterification with the aid of a lipase enzyme, the mixture being hydrogenated before or after interesterification if desired.

The enzymatic reaction is preferably carried out in an organic solvent, e.g. hexane, preferably at a temperature lying between 5° and 80° C., in the presence of for example *Candida cylindricae, Aspergillus niger, Mucor Mihei*, *Rhizopus* and/or *Thermomyces* lipase which is activated beforehand with a small amount of water.

Preferably a lipase is used which acts selectively on the 1- and 3-position of the triglyceride molecule, such as e.g. *Mucor Mihei* and *Mucor Javanicus* lipases. By doing this a limited number of triglycerides is obtained, which considerably simplifies an essential fractionation following this. This fractionation is preferably carried out at a temperature lying between 20° and 40° C. and can be carried out in 1 or in 2 steps.

In the first case the olein fraction is rich in $H_2M$ and in the latter case the mid-fraction is rich in $H_2M$ (this fraction can contain 70% $H_2M$ triglycerides). It is interesting to observe that 80% or more of the $H_2M$ triglycerides are HHM (asymmetric triglycerides).

The hardstock according to the invention is obtained by combining the material containing the $H_2M$ triglycerides thus prepared and the solid fat arising from directed interesterification of the liquid oil. The fat blends according to the invention and particularly fat blends for diet margarines and spreads can be prepared by mixing the hardstock described above with directed, interesterifieed oil optionally fractionated and, if desired, an oil that is liquid at room temperature (20° C.), which contains at least 40% and in the ideal case 60-75% of poly-cis-unsaturated fatty acids. Mixtures of for example safflower oil and sunflower oil are pre-eminently suitable for this purpose. The amounts of hardstock and liquid oil to be used depend on the properties of the product to be prepared and can be varied as desired.

The preferred fat blends for diet margarines and spreads according to the invention are characterized by:
a content of $H_3$ triglycerides, in which H represents $C_{16-24}$ saturated fatty acids, of at most 6% and preferably 1-3%;
a content of $H_2U$ triglycerides, in which H is as defined above and U is a mono- or polyunsaturated $C_{16-24}$ fatty acid, of at least 2% and preferably 3-10%, which triglycerides consist partly or predominantly of asymmetric triglycerides, preferably at least 25%, and ideally 50-85% of said $H_2U$ triglycerides are of the HHU type;
a content of $H_2M$ triglycerides, in which H has the same meaning as above and M is a fatty acid of which the length of the carbon chain is 2-12 carbon atoms shorter than the length of the carbon chain of the fatty acid H, of at least 1% and preferably 2-10%;
a content not exceeding 94%, and preferably ranging from 77-94%, of triglycerides which at 20° C. do not contribute to the solid phase and consist mainly of $U_3$ and $HU_2$ glycerides, all percentages being based on the total weight of the triglycerides in the fat blend.

The preferred fat blends according to the invention are characterized by a specific fatty acid composition and particularly by a content of saturated fatty acids with a chain length of 12-24 carbon atoms of at most 17% and preferably ranging from 10 to 15%;
a content of trans-unsaturated fatty acids of at most 10% and preferably ranging from 0-4%, and
a content of polyunsaturated fatty acids in the cis-configuration of at most 76%, and preferably from 50-76%, the remainder up to 100% consisting mainly of mono-cis-unsaturated fatty acids. Further, the fat blends according to the invention can contain 0-10% diglycerides which preferably consist of HU(OH)-, $H_2$(OH)- and HM(OH)-diglycerides.

The invention also relates to emulsions, particularly water-in-oil emulsions, such as margarines and spreads having a decreased fat content. These are prepared in a manner known per se by emulsifying an aqueous phase in an oil phase which contains the fat blends according to the invention and texturising in e.g. a Votator ®, as described in "Margarine" by Andersen and Williams, Pergamon Press (1965, pages 246 et seq).

In particular, diet margarines and spreads retaining a reasonable consistency can be prepared from a fat blend that contains relatively little solid phase (at 20° C.) by using the hardstocks according to the invention.

Thus, for example, products with only e.g. 3-7% solid phase at 20° C. can be prepared, which have at this temperature a C value of 50-100 g/cm$^2$ in spite of the extremely low level of solids.

The invention will now be explained by reference to the following Examples.

EXAMPLES

Example 1

(A) Preparation of an interesterified oil by directed interesterification

Sunflower oil was dried to a moisture content of less than 0.01 wt.%. 0.6 wt.% sodium methanolate was added to the oil. The catalyst was activated at 55° C. Subsequently, the mixture was cooled to 3° C., at which temperature the directed interesterification was carried out (practically isothermally).

The directed interesterification was carried out for 24 hours, with stirring, whereafter the reaction was stopped by addition of an aqueous solution of an acid. The separated fat was subsequently washed and dried.

The triglyceride composition of the oil which has been subjected to directed interesterification, determined by applying thin-layer chromotography on silica plates impregnated with silver nitrate, was as follows:
$H_3$ triglycerides: 3.2%;
HUH triglycerides: 1.2%;
HHU triglycerides: 4.2%;
$HU_2 + U_3$ triglycerides: 91.4%,
wherein H represents a $C_{16-24}$ fatty acid, U is linoleic acid or oleic acid, HUH are the symmetric triglycerides and HHU are the asymmetric triglycerides.

(B) Preparation of a hardstock fraction rich in $H_2M$ triglycerides

A hardstock fraction was prepared by randomly interesterifying a mixture of hydrogenated palmkernel fat (melting point 39° C.) and hydrogenated palm fat (melting point 58° C.) in a ratio of 50:50. The random interesterification was carried out under nitrogen in the presence of 0.2% sodium methoxide at 80° C. for half an hour. The reaction was stopped by addition of water. The interesterified mixture was washed, dried and deodorized.

The interesterified mixture was fractionated in acetone. The ratio of fat to acetone was 1:5. A first fractionation was carried out at 26° C. This fractionation yielded a first stearin and olein fraction. The olein fraction was subsequently fractionated at 20° C., resulting in a second stearin fraction (mid-fraction) and olein fraction being obtained.

The mid-fraction contained 12% $H_3$ triglycerides, 65% $H_2M$ triglycerides and 23% other triglycerides mainly consisting of $M_3$ and $HM_2$.

(C) Preparation of a fat blend for a diet margarine

A fat blend was prepared from 50% sunflower oil which has been subjected to directed interesterification, 46% sunflower oil and 4% of the mid-fraction prepared under B. The composition of the blend, determined by using the silver nitrate method, was as follows:
$H_3$ triglycerides: 2.1%;
$H_2M$ triglycerides: 2.6%;
HUH triglycerides: 1.8%;
HHU triglycerides: 2.2%;

$HU_2+U_3$ triglycerides: 91.3%.

The blend contained 68% cis-polyunsaturated fatty acids, 15% saturated fatty acids and less than 1% trans-fatty acids.

The ratio of cis-polyunsaturated to saturated fatty acids was 4.5.

(D) Preparation of a diet margarine

A margarine to be packed in a tub was prepared, starting from 16% of an aqueous phase which contained 0.5% milk proteins, and 84% of a fat blend containing 0.25% lecithin prepared according to (C), in a Votator® apparatus according to the usual method as described in "Margarine" by Andersen and Williams, Pergamon Press (1965), pages 246 et seq. The margarine was stable on storage for at least 10 weeks and displayed practically no oil exudation.

The hardness of the margarine measured as C values (cf. J.A.O.C.S. 36 (1959), pages 345–348) was determined at different temperatures:

$C_5 = 275$ g/cm²;
$C_{10} = 200$ g/cm²;
$C_{15} = 135$ g/cm²;
$C_{20} = 50$ g/cm².

Example 2

Sunflower oil subjected to directed interesterification was prepared according to the directions of Example 1.

A hardstock fraction rich in $H_2M$ triglycerides was prepared, this time by a one-step fractionation at 14° C. in acetone of a randomly interesterified mixture obtained starting from a mixture of 80% palmkernel fat (melting point 39° C.) and 20% palm fat (melting point 58° C.). With this fractionation a stearin fraction and an olein fraction formed. The stearin fraction rich in $H_2M$ triglycerides was isolated. This fraction had the following composition:

$H_3$ triglycerides: 15%;
$H_2M$ triglycerides: 55%;
remaining triglycerides (mainly consisting of $HM_2$ and $M_3$): 30%.

A margarine blend was prepared, starting from 50% sunflower oil subjected to directed interesterification, 46% sunflower oil and 4% hardstock (stearin fraction obtained by one-step fractionation). The triglyceride composition of the fat blend was as follows:

$H_3$: 2.2%;
$H_2M$: 2.2%;
HUH: 1.8%;
HHU: 1.8%;
$HU_2+U_3$: 91.6%.

The fat blend contained:
68% cis-polyunsaturated fatty acids;
15% saturated fatty acids;
less than 1% trans-fatty acids.

The ratio of polyunsaturated fatty acids to saturated fatty acids was 4.5.

Diet margarines were prepared according to the directions of Example 1. The margarines were stable on storage for at least 10 weeks and displayed practically no exudation of oil.

The hardness of the margarine was measured at different temperatures:

$C_5 = 240$ g/cm²;
$C_{10} = 185$ g/cm²;
$C_{15} = 115$ g/cm²;
$C_{20} = 50$ g/cm².

Example 3

Sunflower oil subjected to directed interesterification was prepared according to the directions of Example 1. The hardstock fraction, which is rich in $H_2M$ triglycerides, was prepared by (i) random interesterification of a 50/50 mixture of rapeseed oil (rich in erucic acid), hydrogenated to a melting point of 70° C., and palmkernel fat (melting point 39° C.) followed by (ii) a double fractionation in acetone, using the conditions described in Example 1.

The second stearin (mid-fraction) contained 21% $H_3$, 54% $H_2M$ and 25% remaining triglycerides consisting mainly of $HM_2$ and $M_3$.

A fat blend for a diet margarine was prepared, starting from 50% sunflower oil subjected to directed interesterification, 46% sunflower oil and 4% of the midfraction.

The composition of the blend, determined by using the silver nitrate method, was as follows:

$H_3$: 2.3%;
$H_2M$: 2.1%;
HUH: 2.2%;
HHU: 2.2%
$HU_2+U_3$: 91.6%.

The blend contained 68% cis-polyunsaturated fatty acids, 15% saturated fatty acids and less than 1% trans-fatty acids. The ratio of cis-polyunsaturated fatty acids to saturated fatty acids was 4.5. Margarines were prepared according to the directions of Example 1.

The hardness of the margarine was measured at different temperatures:

$C_5 = 245$ g/cm²;
$C_{10} = 210$ g/cm²;
$C_{15} = 150$ g/cm²;
$C_{20} = 85$ g/cm².

Example 4

Sunflower oil subjected to directed interesterification was prepared according to the directions of Example 1.

A hardstock fraction rich in $H_2M$ triglycerides was prepared by one-step fractionation, likewise according to the directions of Example 1.

A fat blend was prepared, starting from 96% sunflower oil subjected to directed interesterification and 4% of the hardstock fraction (stearin fraction obtained according to Example 1).

A spread with a reduced fat content was prepared, starting from 40% of the fat blend and 60% of an aqueous phase containing 0.2% milk protein and 1% gelatin (wt.% on the basis of the total product). The C values of the product measured at different temperatures were:

$C_5 = 100$ g/cm²;
$C_{10} = 90$ g/cm²;
$C_{15} = 60$ g/cm²;
$C_{20} = 55$ g/cm².

Example 5

Sunflower oil subjected to directed interesterification was prepared according to the directions of Example 1.

A hardstock fraction rich in $H_2M$ triglycerides was prepared as follows:

A mixture of one part soya oil and 0.45 parts lauric acid was dissolved in 9 parts hexane and the solution was percolated, at a feeding speed of 4.3 kg/hour, corresponding with 1.0 kg/hour of soya oil, through a column provided with a jacket kept at 40° C. The column was filled with a 1,3-selective enzyme (*Mucor Miehei* lipase) on a Celite carrier. The enzyme had been moistened beforehand to a water content of 10% and conditioned for use as a suspension in a mixture of hexane and soya oil. The feeding speed was responsible for a residence time of about 20 minutes in the reactor. The feed had been moistened beforehand by contact with silica gel and water, as a result of which a water activity of 0.85 was obtained. The liquid leaving the column in a period of 100 hours was extracted with methanol in order to remove free fatty acids and was subsequently hydrogenated, using an active nickel catalyst, to an iodine index of less than 2.

The saturated product A was fractionated in acetone, during which a stearin fraction was removed and an olein fraction (B) was obtained in a yield of 73%.

A margarine was prepared according to the general procedure outlined in Example I, starting from:
(i) 4% (B) as hardstock (when, instead of (B), a midfraction (C) was used which had been prepared by fractionating (B) again at a lower temperature, one could suffice with less than 4% in order to obtain a product having a reasonable consistency);
(ii) 50% sunflower oil subjected to directed interesterification; and
(iii) 46% sunflower oil.

The triglyceride compositions of (A), (B) and (C) are given in the Table.

TABLE

| Type of Glyceride | Carbon Number | (A) | | (B) Olein fraction | | (C) Mid-fraction | |
|---|---|---|---|---|---|---|---|
| | 30–38 | | 2.0 | | 3.5 | | 2.0 |
| | 40 | | 1.0 | | 1.5 | | 0.5 |
| $HM_2$ | 42 | | 15.5 | | 21.0 | | 13.5 |
| | 44 | | 1.5 | | 2.5 | | 2.0 |
| $H_2M$ | 46 | 45.4 | { 9.0 | 57.5 | { 12.0 | 71.0 | { 13.5 |
| | 48 | | 36.5 | | 45.5 | | 57.5 |
| $H_3$ | 50 | | 3.5 | | 4.0 | | 4.0 |
| | 52 | 32.5 | { 9.0 | 15 | { 7.0 | 16.5 | { 8.0 |
| | 54 | | 20.0 | | 4.0 | | 4.5 |
| | 56 | | 1.0 | | 0.5 | | 0.5 |
| Total | | | 99.0 | | 101.5 | | 99.0 |

We claim:
1. Hardstock comprising:
   $H_3$, HHU, HUH and $H_2M$ triglycerides, wherein the ratio of HHU:HUH ranges from 1:4 to 6:1
   H is a saturated $C_{16-24}$ fatty acid;
   U is a mono- or a cis-polyunsaturated $C_{16-24}$ fatty acid;
   M is a saturated fatty acid, the chain length of which is 2 to 10 C-atoms shorter than the chain length of H,
   wherein the ratio of $H_2M:H_3$ ranges from 1:2 to 4:1.
2. Hardstock according to claim 1, wherein the amount of $H_3$ does not exceed 60% by weight, the amount of $H_2M$ does not exceed 65% and the amount of $H_2U$ does not exceed 70 wt.%.
3. Hardstock according to claim 1 wherein the $H_2M:H_3$ ranges from 1:1 to 3:1.
4. Hardstock according to claim 1, wherein the amount of $H_3$ ranges from 10 to 55 wt.%, the amount of $H_2M$ ranges from 15 to 60 wt.%, and the amount of $H_2U$ ranges from 30 to 65 st.%.
5. Hardstock according to claim 1 wherein the M fatty acid is a saturated $C_{12}$ or $C_{14}$ fatty acid.

* * * * *